4,033,052

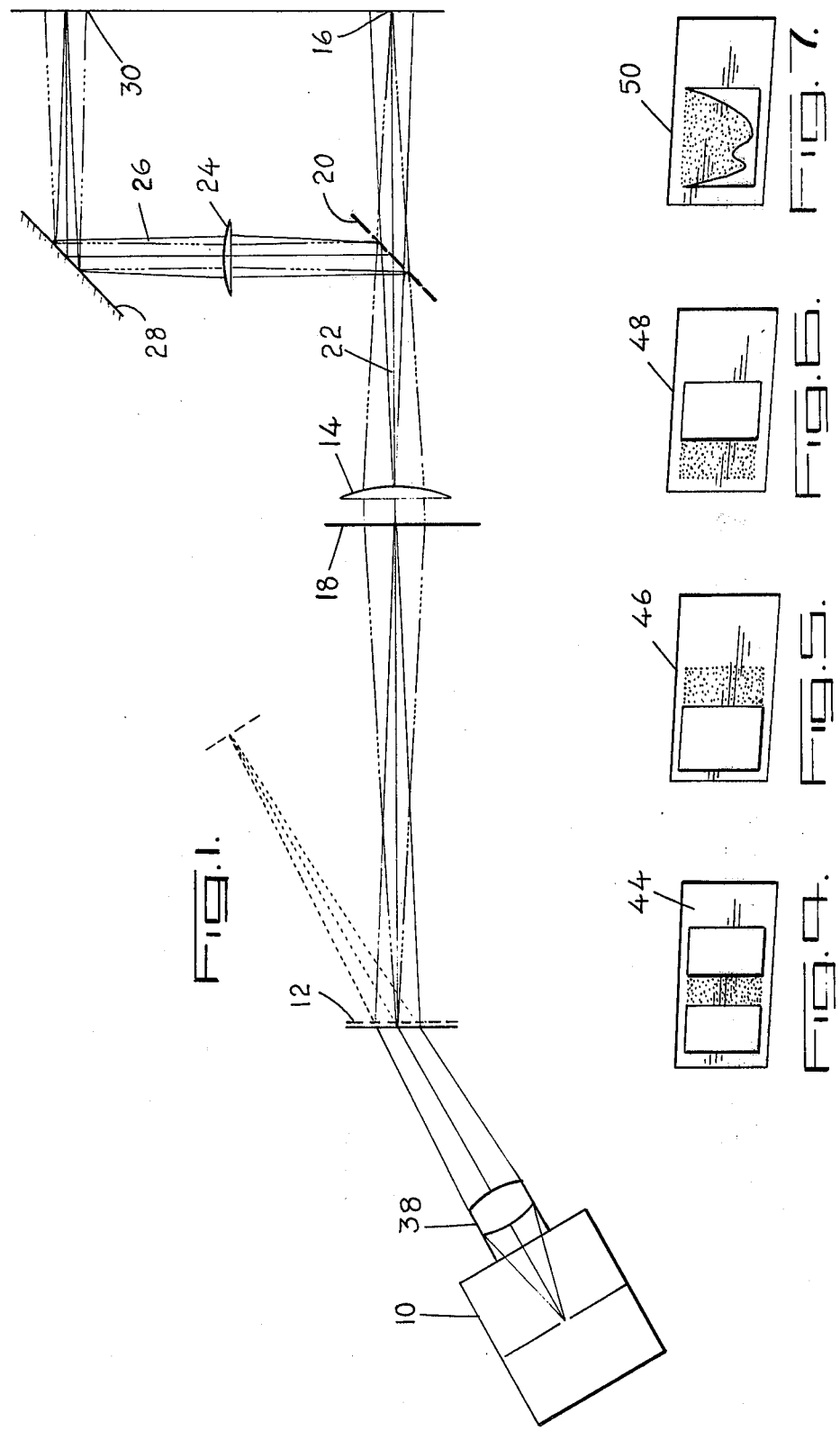

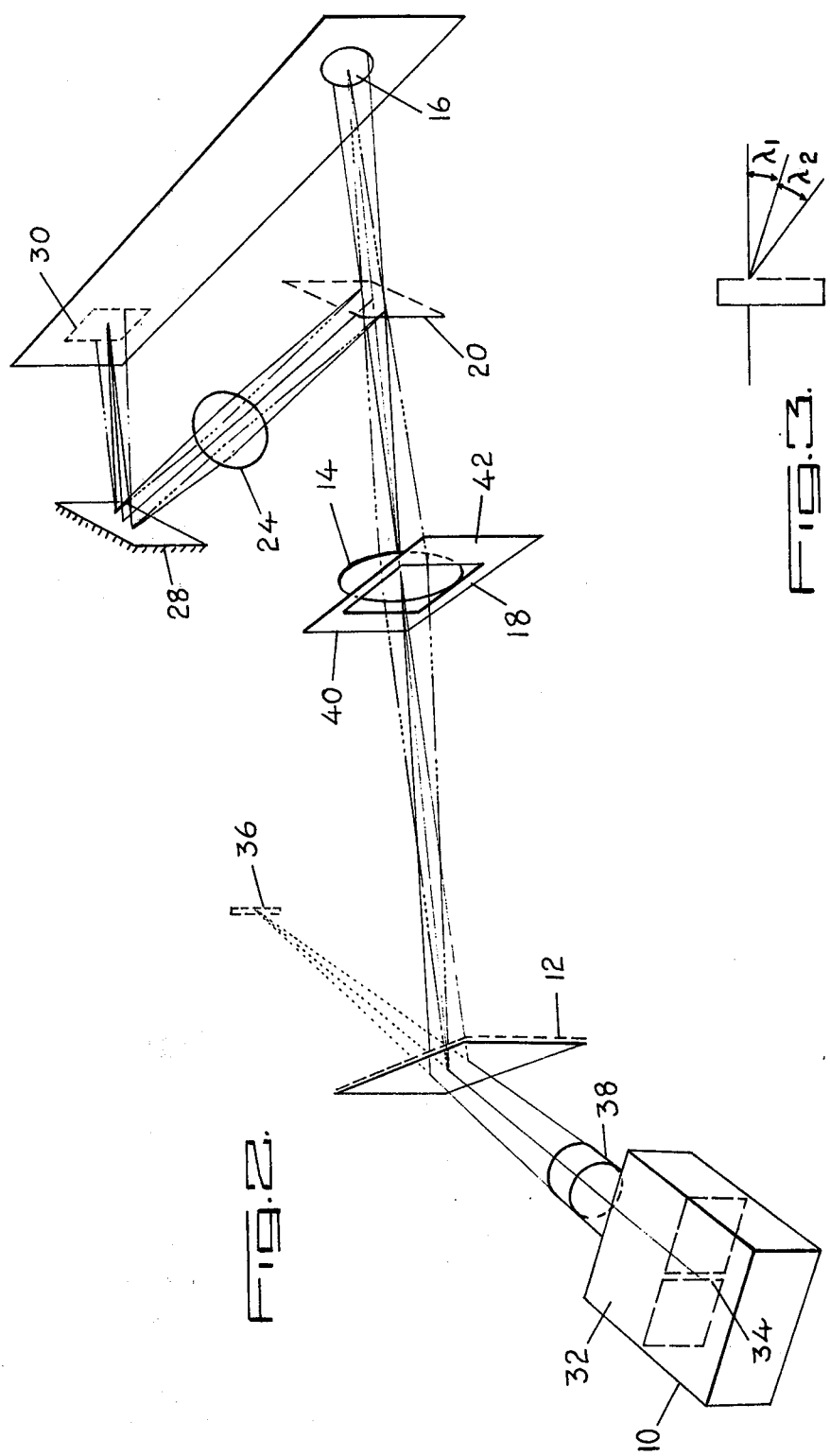

OPTICAL TEACHING AID

BACKGROUND OF THE INVENTION

1. Field of the Invention

This invention relates to a teaching aid which demonstrates the component pure spectral colours of white light and the effect of selective recombination of a particular group and intensity of those pure spectral colours to form an area of light of uniform colour.

2. Description of the Prior Art

Historically, Sir Isaac Newton was one of the first persons to conduct an experiment whereby the colours of the spectrum produced by passing white light through a first prism were recombined by means of a second prism or lens to produce the original white light, thereby demonstrating conclusively that white light was a mixture of spectral colours. Since then, the sciences of colourimetry and spectrophotometry have become extremely complex yet many of the principles and equipment used today are based on the conclusion originally demonstrated by Newton. This invention relates to an aid for the teaching and understanding of these basic principles.

SUMMARY OF THE INVENTION

To this end, in one of its aspects, the invention provides an improved teaching aid to demonstrate the component pure spectral colours of white light and the effect of selective recombination of a particular group and intensity of these pure spectral colours to form an area of light of uniform colour.

The invention provides a teaching aid for demonstrating the principle of selective colour combination and recombination which comprises a light source emitting light, a diffraction means adapted to diffract said emitted light, a selective spatial filter means adapted to selectively filter the diffracted light, the spatial filter being placed at the spectrum formed by the diffracted light, a first focusing means placed subsequent to and near the selective spatial filter means adapted to focus the selectively filtered light to a subsequent first viewing position, a beam splitting means adapted to split the focused and filtered light into at least one split beam and one transmitted beam, the beam splitting means placed subsequent to the first focusing means and in front of the subsequent first viewing position, focusing means adapted to focus the split beam to a subsequent second viewing position.

In another of its aspects, the invention provides a teaching aid which comprises a light source illuminating a vertical slit and a first focusing means adapted to focus the light emitted from the slit to a blazed diffraction grating, a selective spatial filter placed in the spectrum of the light emitted from the grating, a second focusing means placed subsequent to and near the selective spatial filter, the second focusing means adapted to focus the selectively filtered light to a subsequent first viewing position, a beam splitting means adapted to split the focused light into a split beam and a transmitted beam, a relay lens adapted to relay the split beam to a mirror, the mirror adapted to reflect the split beam to a subsequent second viewing position, the subsequent second viewing position of the split beam and the subsequent first viewing position of the selectively filtered transmitted beam being in the same conjugate plane.

Further objects and advantages of the invention will appear from the following description taken together with the accompanying drawings.

BRIEF DESCRIPTION OF THE DRAWINGS

FIG. 1 is a plan view of the invention of the present invention.

FIG. 2 is an isometric view of the invention of the present invention.

FIG. 3 illustrates a simple diffraction grating.

FIGS. 4 to 7 illustrate various selective filters used in the present invention. (These figures appear on the page with FIG. 1.)

DESCRIPTION OF THE PREFERRED EMBODIMENT

The present invention discloses a device which demonstrates the principle of additive and subtractive colour. The word "colour" in the present specification is used in the visual sense to describe the integrated effect of many pure spectral colours rather than to the pure spectral colours themselves.

The principles of additive and subtractive colour in relation to a three colour system may be clearly demonstrated by the following device.

Referring to FIG. 1, a light source 10 emits white light which impinges on a dispersion means 12. The white light is then dispersed according to its wavelength and passes through a focusing lens 14 and is imaged at position 16. A selective spatial filter means 18 is placed before the lens 14 and this filter selectively filters the light from the dispersion means 12 onto the focusing lens 14. A beam splitter 20 is placed subsequent to the lens 14 and in front of the position 16. The beam splitter 20 splits the filtered light 22 and reflects a portion thereof to a relay lens 24 which in turn relays the split beam 26 to a reflecting device 28 which in turn reflects the light to a screen 30.

The screen 30 thus becomes a function of the selective filter 18 and demonstrates which parts of the spectrum are selectively filtered. The viewing position 16 shows the resulting colour of the light after the filter 18 selectively filters the light. Thus, if the screen 30 and the position 16 are placed on a projection screen, the effect of selectively filtering dispersed white light is shown by the integrated result of the light at the position 16. When the design of the selective filter is varied, these variations are shown on the screen 30 as a function of the filter 18 and the effect is clearly seen by the integrated result at position 16.

The source 10 may comprise a standard 35 mm slide projector having a light source and a projection lens. As shown in FIG. 2, the projector 32 is used to project an image of a vertical slit 34 to a position 36. The present invention is not restricted to one utilizing this projector and it is recognized that any suitable source of white light may be substituted therefore.

The dispersing element 12 is placed immediately after the projection lens 38. It is understood that any dispersion means may be used and the preferred embodiment of the device utilizes a diffraction means as the dispersion element and reference will now be made to the device utilizing a diffraction means.

The simplest form of a diffraction grating is a set of parallel lines or grooves as seen in FIG. 3. The light is diffracted at the lines or grooves depending upon the wavelength the longer the wavelength, i.e., the red, the greater the angle of diffraction will be.

The device may be used as follows to demonstrate the component parts of white light and the effects of their selective combination.

Filters are used which remove single colours from the spectrum. If the filter as seen in FIG. 4 were used, then only the red and the blue light would be transmitted and the colour at the viewing position 16 would appear magenta. At position 30, the image of the filter would appear with a red band on one side and a blue band on the opposite side with the green band removed. Thus, the student would see first at position 30, these colours which were transmitted and the colours which were filtered out and then the effect of this filtering would be seen by the colour exhibited at position 16.

By using the filters as shown in FIGS. 4, 5 and 6, the principles of colour addition and subtraction can be clearly shown. After demonstrating the aforenoted principle, the principles of spectral distribution can be demonstrated by using filters such as the one illustrated in FIG. 7. These filters do not necessarily block out an entire wavelength and transmit other wavelengths but they filter out various portions of the selected wavelengths. Thus, the intensity of each wavelength passing through the filter may be controlled. Again, the effect of varying the intensities of the transmitted wavelengths will be shown by changing the colour at the position 16.

Although the disclosure describes and illustrates a preferred embodiment of the invention, it is to be understood that the invention is not restricted to this particular embodiment.

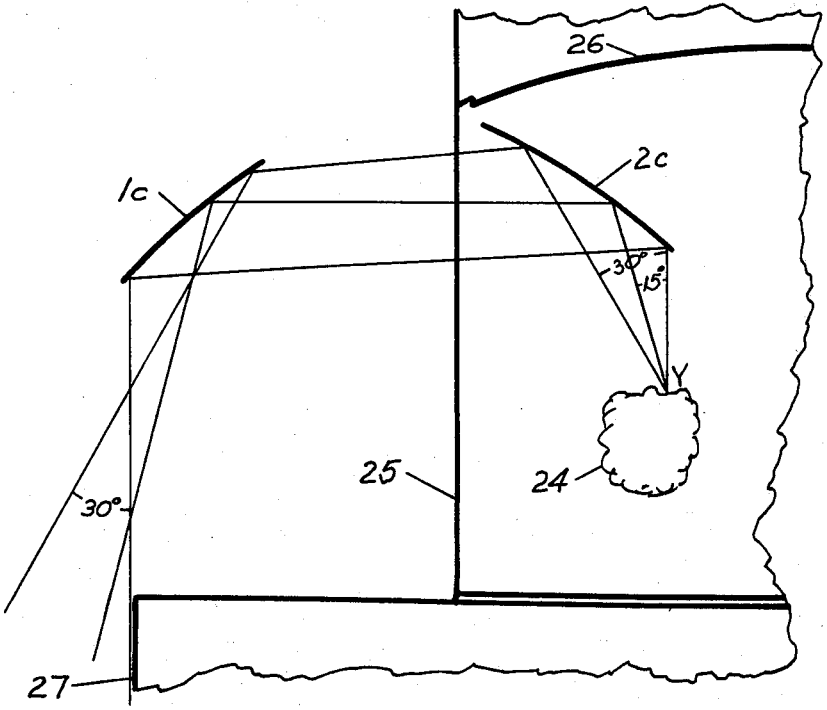

What I claim is:

1. A teaching aid for demonstrating the principles of colour by direct comparison of spectral distribution and the perceived colour due to said distribution, which comprises:
   a. a light source emitting light;
   b. a diffraction means adapted to diffract said emitted light;
   c. a selective spatial filter means adapted to selectively filter said diffracted light, said filter placed at the spectrum formed by said diffracted light;
   d. a focusing means placed subsequent to and near said selective filter means adapted to focus said selectively filtered light to a subsequent first viewing position;
   e. a beam splitting means adapted to split said focused and filtered light into at least one split beam and one transmitted beam, the beam splitting means subsequent to the focusing means and in front of the first subsequent viewing position.

2. The teaching aid as claimed in claim 1 further including a second focusing means adapted to focus said at least one split beam to a subsequent second viewing position.

3. The teaching aid as claimed in claim 1 wherein said light source comprises an illuminated slit and a focusing means adapted to focus said light onto said diffraction means.

4. The teaching aid as claimed in claim 3 wherein said slit is a vertical slit.

5. The teaching aid as claimed in claim 1 wherein said diffraction means is a diffraction grating.

6. The teaching aid as claimed in claim 5 wherein said diffraction grating is blazed.

7. The teaching aid as claimed in claim 1 wherein said diffraction means is a plane reflection grating, a plane transmission grating, a curved reflection grating, a prism, an assembly of prisms or a combination of gratings and prisms.

8. The teaching aid as claimed in claim 1 wherein the subsequent position to which the selectively filtered light and the subsequent viewing position to which the split beam is focused are adjacent in a conjugate plane.

9. The teaching aid as claimed in claim 8 wherein a viewing screen is placed in said conjugate plane.

10. A teaching aid for demonstrating the principle of selective colour combination and recombination comprising a light source illuminating a vertical slit and a first focusing means adapted to focus the light emitted from the slit to a blazed diffraction grating, a selective spatial filter placed in the spectrum of the light emitted from the grating, a second focusing means placed subsequent to and near the selective filter, the second focusing means adapted to focus the selectively filtered light to a subsequent first viewing position, a beam splitting means adapted to split the focused light into a split beam and a transmitted beam, a relay lens adapted to relay the split beam to a mirror, the mirror adapted to reflect the split beam to a subsequent second viewing position, the subsequent second viewing position of the split beam and the subsequent first viewing position of the selectively filtered transmitted beam being in the same conjugate plane.

11. The teaching aid as claimed in claim 10 further including a projection screen placed in said conjugate plane wherein said first viewing position and said second viewing position are projected.

* * * * *

United States Patent [19]

Rudd

[11] 4,033,678
[45] July 5, 1977

[54] TWO-MIRROR SYSTEMS FOR PERISCOPIC REARWARD VIEWING

[76] Inventor: Milo O. Rudd, 2119 NE. 15 Terrace, Fort Lauderdale, Fla. 33305

[22] Filed: May 21, 1975

[21] Appl. No.: 579,365

[52] U.S. Cl. .............................. 350/302; 350/294; 350/301; 350/320
[51] Int. Cl.² ......................................... G02B 5/10
[58] Field of Search .......... 350/293, 294, 299, 301, 350/302, 307

[56] References Cited

UNITED STATES PATENTS

| | | | |
|---|---|---|---|
| 1,785,347 | 12/1930 | Herrschaft | 350/294 UX |
| 2,193,217 | 3/1940 | Allen | 350/301 X |
| 2,296,943 | 9/1942 | Okolicsany | 350/294 X |
| 2,942,522 | 6/1960 | Merriam | 350/294 |
| 3,224,330 | 12/1965 | Kompfner | 350/294 UX |
| 3,353,893 | 11/1967 | Bamberger et al. | 350/294 X |
| 3,762,794 | 10/1973 | Arnaud | 350/294 X |

Primary Examiner—F. L. Evans
Attorney, Agent, or Firm—Kane, Dalsimer, Kane, Sullivan and Kurucz

[57] ABSTRACT

An optical system comprised of two cylindrically concave mirrors provides an advantageous rearward viewing device. Light rays from the object field to the rear proceed to a first mirror at the side of or above the observer, then to a second mirror forward of the observer, and then to the eyes of the observer. The mirror orientations and shapes are so determined as to produce cooperatively a suitably sharp, undistorted, and unreversed view to the rear over a usefully large angular extent. Comfortable binocular vision is obtainable along with latitude for movement of the observer's head. The system is particularly suited for use as a rearview periscope for vehicles. Examples of its use are given, along with procedures for determining the system designs which are applicable to a wide range of installation requirements.

19 Claims, 36 Drawing Figures